(12) United States Patent
Parry-Jones et al.

(10) Patent No.: US 9,019,722 B2
(45) Date of Patent: Apr. 28, 2015

(54) FLEXIBLE PRINTED CIRCUIT BOARD HARNESS

(71) Applicant: Rolls-Royce plc, London (GB)

(72) Inventors: Ian Mark Parry-Jones, Market Drayton (GB); Jaspal Singh Johal, Derby (GB)

(73) Assignee: Rolls-Royce plc, London (GB)

( * ) Notice: Subject to any disclaimer, the term of this patent is extended or adjusted under 35 U.S.C. 154(b) by 92 days.

(21) Appl. No.: 13/659,254

(22) Filed: Oct. 24, 2012

(65) Prior Publication Data
US 2013/0114236 A1    May 9, 2013

(30) Foreign Application Priority Data
Nov. 4, 2011  (GB) .................................. 1119037.8

(51) Int. Cl.
*H02G 3/00*    (2006.01)
*H02G 3/32*    (2006.01)
*F02C 7/32*    (2006.01)
*F02C 7/00*    (2006.01)

(52) U.S. Cl.
CPC ............ *H02G 3/32* (2013.01); *Y10T 29/49959* (2015.01); *F02C 7/32* (2013.01); *F02C 7/00* (2013.01); *F05D 2250/75* (2013.01); *F05D 2260/30* (2013.01); *Y02T 50/672* (2013.01)

(58) Field of Classification Search
USPC ............... 439/498; 361/797, 798; 211/41.14
See application file for complete search history.

(56) References Cited

U.S. PATENT DOCUMENTS

| 4,059,328 | A | * | 11/1977 | Rigo .............................. 439/535 |
| 4,538,782 | A |   | 9/1985 | Kirschenbaum |
| 5,730,613 | A | * | 3/1998 | Yamada ......................... 439/293 |
| 6,589,068 | B2 | * | 7/2003 | Yu .................................. 439/495 |
| 6,722,915 | B1 | * | 4/2004 | McAlonis et al. ............. 439/498 |
| 2006/0185888 | A1 |   | 8/2006 | Yamada et al. |
| 2007/0142785 | A1 | * | 6/2007 | Lundgaard et al. ........... 604/179 |

FOREIGN PATENT DOCUMENTS

| EP | 1 725 089 A1 | 11/2006 |
| EP | 2 278 203 A1 | 1/2011 |
| GB | 2463867 A * | 3/2010 |
| JP | 2002204082 A * | 7/2002 |

(Continued)

OTHER PUBLICATIONS

Mar. 20, 2012 British Search Report issued in British Patent Application No. GB1119037.8.

(Continued)

*Primary Examiner* — William H Mayo, III
*Assistant Examiner* — Krystal Robinson
(74) *Attorney, Agent, or Firm* — Oliff PLC

(57) ABSTRACT

A gas turbine engine installation is provided that has a plurality of flexible printed circuit board (FPCB) harnesses to transfer electrical signals, including electrical power, around a gas turbine engine. The plurality of FPCB harnesses is held to the gas turbine engine installation using clips that have at least two jaws. Each jaw has two sets of opposing teeth that do not intermesh, and cannot intermesh when pushed together. This allows more than one FPCB harness to be held by one clip without the risk of damaging the FPCB harnesses. Preventing the teeth from intermeshing also allows subsequent FPCB harnesses to be inserted into the clip without undue difficulty even after a first FPCB harness has already been inserted.

14 Claims, 6 Drawing Sheets

(56) References Cited

FOREIGN PATENT DOCUMENTS

| JP | A-2002-204082 | 7/2002 |
| WO | WO 2005/051472 A2 | 6/2005 |

OTHER PUBLICATIONS

Search Report issued in European Application No. 12 18 9694 dated Aug. 28, 2013.

\* cited by examiner

FLEXIBLE PRINTED CIRCUIT BOARD HARNESS

CROSS-REFERENCE TO RELATED APPLICATIONS

This application is based upon and claims the benefit of priority from British Patent Application Number 1119037.8 filed 4 Nov. 2011, the entire contents of which are incorporated by reference.

BACKGROUND OF THE INVENTION

1. Field of the Invention

This invention relates to a network for distributing signals and power around a gas turbine engine using a flexible harness. In particular, this invention relates to clips for holding a flexible harness for a gas turbine engine.

2. Description of the Related Art

A typical gas turbine engine has a substantial number of electrical components which serve, for example, to sense operating parameters of the engine and/or to control actuators which operate devices in the engine. Such devices may, for example, control fuel flow, variable vanes and air bleed valves. The actuators may themselves be electrically powered, although some may be pneumatically or hydraulically powered, but controlled by electrical signals.

Electrical power, and signals to and from the individual electrical components, are commonly transmitted along conductors. Conventionally, such conductors may be in the form of wires and cables which are assembled together in a harness. In such a conventional harness, each wire may be surrounded by an insulating sleeve, which may be braided or have a braided cover. The connections between the individual components and the conventional harness are made, for example, by multi-pin plug and socket connectors. Similarly, communication between the harness and power, control and signalling circuitry is achieved through a multi-pin connector.

By way of example, FIG. 1 of the accompanying drawings shows a typical gas turbine engine including two conventional wiring harnesses 102, 104, each provided with a respective connector component 106, 108 for connection to circuitry accommodated within the airframe of an aircraft in which the engine is installed. The harnesses 102, 104 are assembled from individual wires and cables which are held together over at least part of their lengths by suitable sleeving and/or braiding. Individual wires and cables, for example those indicated at 110, emerge from the sleeving or braiding to terminate at plug or socket connector components 112 for cooperation with complementary socket or plug connector components 114 on, or connected to, the respective electrical components.

Each conventional harness 102, 104 therefore comprises a multitude of insulated wires and cables. This makes the conventional harness bulky, heavy and difficult to manipulate. It is desirable to reduce the size and weight of components on gas turbine engines, particularly, for example, gas turbine engines for use on vehicles, such as aircraft.

It is proposed to replace at least a portion of, for example all of, the conventional harness with a flexible printed circuit board harness (FPCB harness). An example of a portion of such a flexible printed circuit board harness 20 is shown in FIGS. 2 to 5. FIG. 2 shows a perspective view of the FPCB harness portion, and FIGS. 3, 4, and 5 show side, top, and cross-sectional views respectively.

Such an FPCB harness 20 may comprise a flexible (for example elastically deformable) substrate 40 with conductive tracks 30 laid/formed therein. The FPCB harness 20 may thus be deformable. In the example shown in FIGS. 2 to 5, the FPCB harness 20 extends along a length in the x-direction, a width in the y-direction, and a thickness (or depth or height) in the z-direction. The x direction may be defined as the axial direction of the FPCB harness. Thus, the x-direction (and thus the z-direction) may change along the length of the FPCB harness 20 as the FPCB harness is deformed. This is illustrated in FIG. 3. The x-y surface(s) may be said to be the major surface(s) of the FPCB harness. In the example shown in FIGS. 2 to 5, the FPCB harness is deformable in the z direction. i.e. in a direction perpendicular to the major surface. FPCB harnesses may be additionally of alternatively deformable about any other direction, and/or may be twisted about any one or more of the x, y, or z directions.

The flexible substrate 40 may be a dielectric. By way of example, the substrate material may be, by way of example only, polyamide. As will be readily apparent, other suitable substrate material could alternatively be used.

The conductive tracks 30, which may be surrounded by the substrate, may be formed using any suitable conductive material, such as, by way of example only, copper, although other materials could alternatively be used. The conductive tracks 30 may be used to conduct/transfer electrical signals and/or electrical power, for example around a gas turbine engine and/or to/from components of a gas turbine engine and/or an airframe attached to a gas turbine engine. The size (for example the cross-sectional area) and/or the shape of the conductive tracks 30 may depend on the signal to be transmitted through the particular conductive track 30. Thus, the shape and/or size of the individual conductive tracks 30 may or may not be uniform in a FPCB harness 20.

The example shown in FIGS. 2 to 5 has 6 conductive tracks 30 running through the substrate 40. However, the number of conductive tracks 30 running through a substrate 40 could be fewer than 6, or greater than 6. Indeed the number of conductive tracks 30 could be far greater than 6, for example tens or hundreds of tracks, as required. As such, many electrical signals and/or power transmission lines may be incorporated into a single FPCB harness.

A single FPCB harness 20 may comprise one layer of tracks, or more than one layer of tracks, for example, 2, 3, 4, 5, 6, 7, 8, 9, 10 or more than 10 layers of tracks. An FPCB harness may comprise significantly more than 10 layers of tracks, for example at least an order of magnitude more layers of tracks. In this regard, a layer of tracks may be defined as being a series of tracks that extend in the same x-y surface. Thus, the example shown in FIGS. 2 to 5 comprises 2 layers of tracks 30, with each layer comprising 3 tracks.

Using an FPCB harness to transmit electrical signals and/or power is therefore advantageous over a conventional harness, for example because of its reduced size, weight and/or complexity.

In order to attach a harness to a component (for example to a gas turbine engine or related airframe), a clip is required. An example of a clip that may be used to attach a conventional harness to a gas turbine engine is shown in FIG. 7. The clip 50 shown in FIG. 7 is configured to hold a cable, or a bundle of cables which form at least a part of a conventional wire cable harness. The clip 50 has a generally cylindrical outer casing 52 with a diameter 56 and a structural internal element 54 configured to provide strength to the clip 50. The clip 50 shown in FIG. 7 also has teeth 56 configured to grasp the generally cylindrical conventional cable harness, although the teeth 56 may not be present in some conventional clips.

FIGS. 8 and 9 show an alternative clip 60 for holding a conventional cable harness. The clip 60 shown in FIGS. 8 and 9 comprises two arms 64, 66 that define a space 62 therebetween for holding a conventional cable harness or bundle of cable harnesses. The space 62 defined between the two arms 64, 66 may be generally cylindrical. The two arms 64, 66 are sprung so as to be able to accommodate various diameters of conventional cable harnesses.

OBJECTS AND SUMMARY OF THE INVENTION

FPCB harnesses have properties that present difficulties when considering how to attach them to components, for example of a gas turbine engine. For example, the FPCB harnesses may have mechanical properties that mean that known clips, such as those described above, are not suitable for attaching them to components. Purely by way of example only, the flexible substrate material may be relatively easily damaged (for example punctured or sliced) by conventional clips.

As explained herein, FPCB harnesses offer considerable advantages over conventional harness in terms of, amongst other things, size and weight. It is desirable to maximize this size/weight benefit by providing an attachment device for allowing the FPCB harnesses to be connected to components in a compact, efficient manner. Conventional clips are therefore not desirable, or even suitable.

According to the an aspect of the invention, there is provided a gas turbine engine installation comprising at least two flexible printed circuit board harnesses arranged to transfer electrical signals around the engine installation, and at least one clip holding at least two flexible printed circuit board harnesses. Each clip comprises a first jaw and a second jaw that hold respective first and second flexible printed circuit board harnesses. The first and second jaws each comprise a set of directly opposing, non-overlapping, compliant teeth arranged to grip the respective harness.

The electrical signals can be of any type that may be transmitted along electrical conductors, for example electrical power transmission, and/or signals (for example control signals) to, from or between components (for example electrical components) of the gas turbine engine installation. The FPCB harnesses for transmitting the electrical signals may be as described herein, for example with reference to FIGS. 2 to 5.

Because the sets of teeth in each jaw are directly opposing, their tips may not intermesh if the sets of teeth are pushed together. Instead, if the sets of teeth are pushed together (i.e. opposing teeth are moved towards each other), the tips of the opposing teeth may come into contact with each other, but cannot move past each other. As such, this arrangement of teeth means that the opposing teeth in a jaw cannot overlap (i.e. the tips of the upper set of teeth cannot move past than the tips of the lower set of teeth and vice versa), and thus cannot intermesh when pushed together.

An advantage of this arrangement of teeth in the jaws is that once the first flexible printed circuit board harness has been pushed into the first jaw and gripped by the respective teeth, the teeth of the second jaw do not (indeed cannot) intermesh. This means that the second flexible printed circuit board harness can be inserted into the second jaw even if the first flexible printed circuit board harness has already been inserted into the first jaw, because the teeth of the second jaw remain non intermeshed at all times. If the teeth of the second jaw were to intermesh, it would be extremely difficult, or even impossible, to insert the second flexible printed circuit board harness into the second jaw.

A further advantage of arranging the teeth to be directly opposing, non-overlapping and compliant is that it enables the respective FPCB harness to be appropriately gripped, whilst reducing (or substantially eliminating) the possibility of damage to the FPCB harness. For example, by avoiding the possibility of opposing teeth intermeshing, the FPCB harness can remain substantially flat within the jaw (for example without containing regions of high curvature), thereby reducing the possibility of damage, such a splitting or fretting, to the FPCB harness.

The invention provides a method of assembling a gas turbine engine installation. The method comprises providing at least two flexible printed circuit board harnesses arranged to transfer electrical signals (which, as explained above, may be of any type) around the engine installation. The method comprises attaching a first flexible printed circuit board harness to the rest of the gas turbine engine installation by inserting a portion thereof into a first jaw provided in a dip. The method comprises attaching a second flexible printed circuit board harness to the rest of the gas turbine engine installation, after attaching the first flexible printed circuit board harness, by inserting a portion thereof into a second jaw provided in the dip. Each jaw comprises a set of directly opposing, non-overlapping, compliant teeth, such that before and during the step of attaching the second flexible printed circuit board harness, the opposing teeth of the second jaw are not intermeshed.

This method provides various advantages, including those outlined above and elsewhere herein in relation to the gas turbine engine installation.

A gap may be provided between directly opposing teeth. Such a gap may be provided when the jaw is in an undeformed state, for example when no external forces are applied to it. The gap may be set to facilitate insertion of the FPCB into the jaw, whist providing sufficient grip to hold the FPCB in use. The gap may depend on the thickness of the FPCB harness intended to be inserted into the jaw. The gap may be set to allow FPCB harnesses with a range of thicknesses to be inserted.

The gap may be in the range of from 0.1 mm to 10 mm, for example 0.5 mm to 5 mm, for example 1 mm to 4 mm, for example 2 mm to 3 mm, for example on the order of 2.5 mm. In alternative arrangements, there may be no gap between opposing teeth in a jaw in the undeformed state. This may be particularly suitable for holding particularly thin FPCB harnesses.

The tips of (some or all of) the teeth may be blunt. This may mean that the tips of the teeth may not be sharp, or not pointed. It may mean that the tips of the teeth do not have an apex. Thus, the tips of the teeth may be squared off, i.e. the parts of opposing teeth that face each other may be flat surfaces, which may be parallel. The tips of the teeth may take other suitable shapes, such as a rounded shape.

Having blunt tips may help to reduce the pressure applied to the FPCB harness when it is gripped by the teeth. This may help to reduce, or substantially eliminate, the possibility of damage to the FPCB harness when it is gripped.

At least one of the first and second jaws may be formed using a material comprising one or more of ethylene-propylene rubber, a silicone based compound, and a nitrile material. These materials may provide good grip to a FPCB harness whilst being compliant so as to minimize the possibility of damage to the FPCB harness. The particular material may be chosen depending on the application, for example the environment (for example in terms of temperature variation) in which the clip is to be used and/or the type of FPCB harness it is to be used with.

At least one clip (for example all clips) may further comprise a support structure configured to resist changes in shape of the clip under operational loads. The support structure may be relatively more stiff than the jaws. As such, the support structure may help to reduce, or substantially prevent flexing of the clip, for example flexing of the external shape of the clip. This may help to ensure that the jaws retain the desired shape under load, for example it may help to ensure that the jaws don't flex apart more than a desired amount when a FPCB harness is inserted. This may help to ensure that the FPCB harnesses are clamped with the desired force.

The clip may comprise a main body that may incorporate the jaws. The main body may thus be integral with the jaws and, for example, manufactured from the same material and/or using the same process as the jaws. The support structure may extend around at least a part of the main body. This may be a convenient arrangement for providing structural support to the clip.

The support structure may be formed using a material comprising metal and/or a composite/fibre resin. The support structure may thus be constructed using a material that is more stiff than the main body and/or the jaws of the clip. This may allow the clip to be structurally stiff, whilst retaining compliant teeth for gripping the FPCB harness.

The support structure may further comprise an attachment portion used to attach the clip to the gas turbine engine, or a component thereof. Thus, the clip can be particularly compact, with a minimal number of parts required to attach it (and thus a FPCB harness) to a component. This may have further weight and/or size benefits.

Each flexible printed circuit board harness may be described as a thin, elongate member. Such a thin, elongate member may have a major surface defined by a length and a width, and a thickness normal to the major surface. The teeth of the clip may thus contact, and grip, the major surface (the elongate member may be said to have two parallel major surfaces offset by the thickness of the FPCB, with one set of teeth contacting and gripping one major surface and the other set of teeth contacting and gripping the other major surface).

The teeth of at least one clip may extend in a direction that corresponds to the length direction of the respective flexible printed circuit board harness when gripped. This may provide particularly strong resistance to the FPCB harness being pulled out of the jaw in the width direction.

The teeth of at least one clip may extend in a direction that corresponds to the width direction of the respective flexible printed circuit board harness when gripped. This arrangement may facilitate insertion of the FPCB harness into the clip, and/or may provide particularly strong resistance to the FPCB harness being pulled through the jaw in the length direction.

A lengthwise extending portion of the flexible printed circuit board harness may be held by two opposing clips, each opposing clip extending across no more than half of the width of the flexible printed circuit board harness. Such an arrangement may provide more secure retention of the FPCB harness. For example, such an arrangement may reduce (or substantially eliminate) the possibility of the FPCB harness being pulled out of a clip in a width direction.

BRIEF DESCRIPTION OF THE DRAWINGS

The invention will now be described, by way of example only, with reference to the accompanying Figures, in which.

DETAILED DESCRIPTION OF THE PREFERRED EMBODIMENTS

Figure 1:
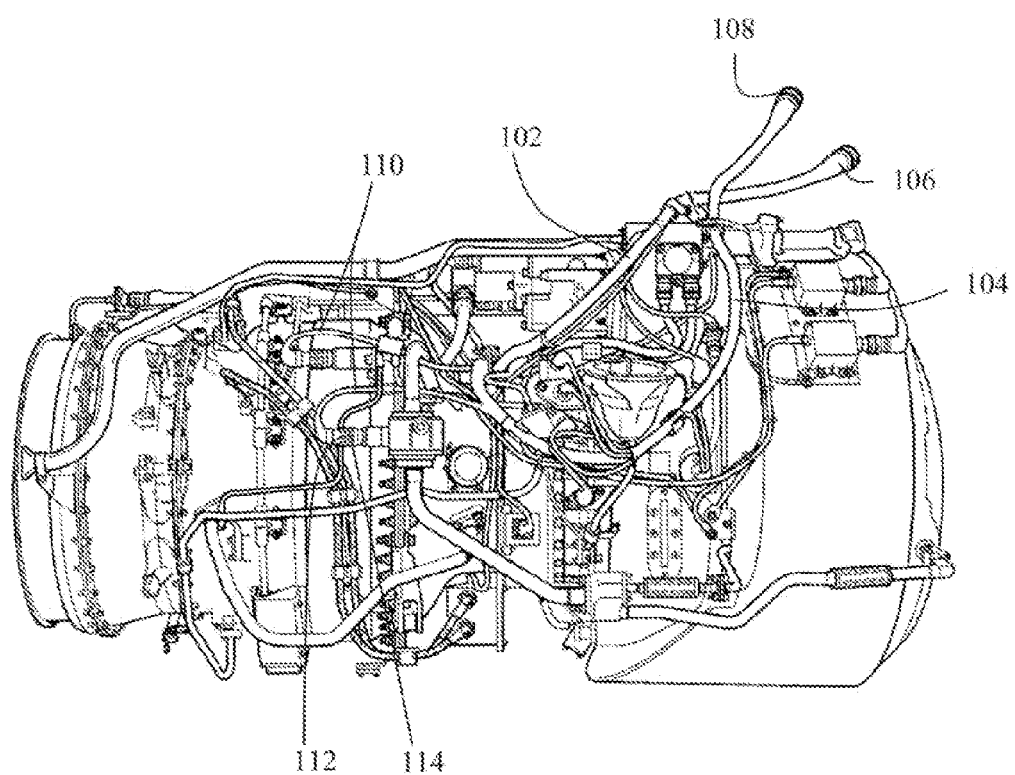
FIG. 1 shows a gas turbine engine with a conventional harness.
Figure 2:
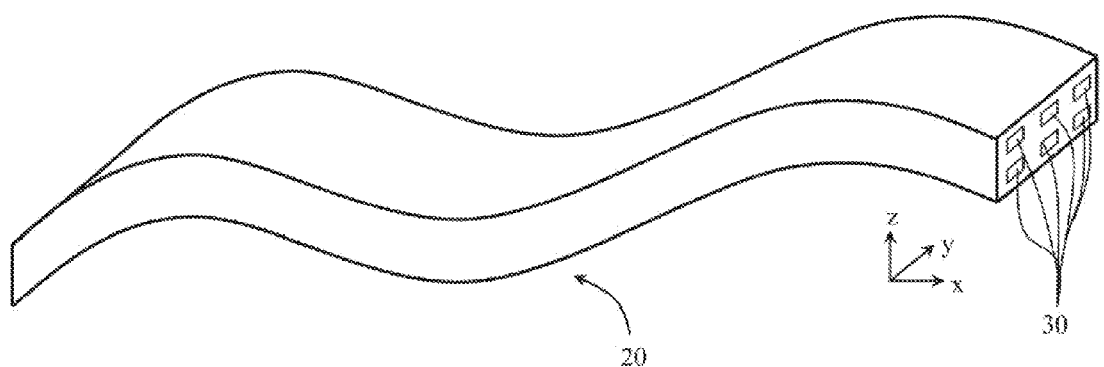
FIG. 2 shows perspective view of a portion of a flexible printed circuit board harness.
Figure 3:
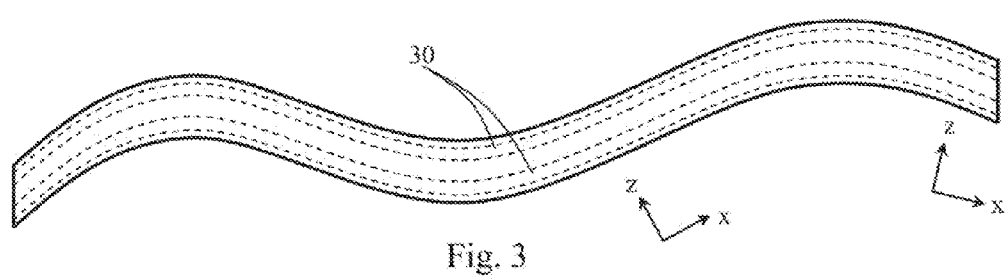
FIG. 3 shows a side view of the flexible printed circuit board harness of FIG. 2.
Figure 4:
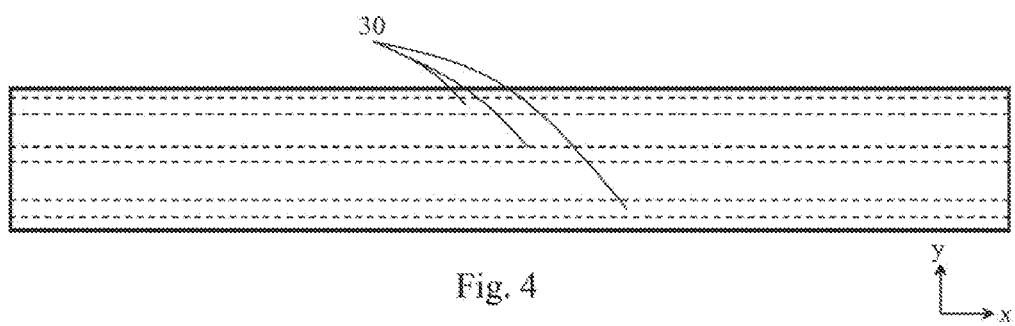
FIG. 4 shows a top view of the flexible printed circuit board harness of FIG. 2.
Figure 5:
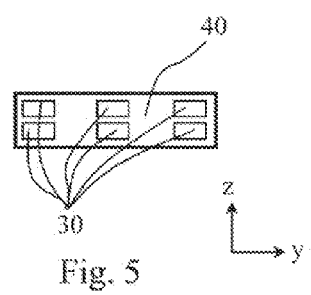
FIG. 5 shows a cross-sectional view of the flexible printed circuit board harness of FIG. 2.
Figure 6:
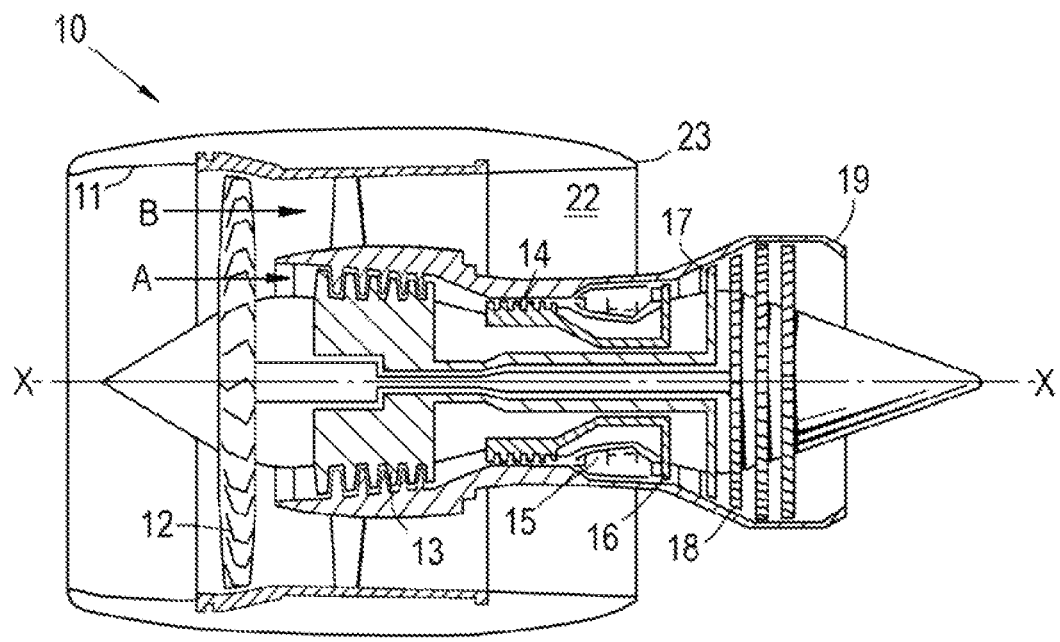
FIG. 6 is a cross-section through a gas turbine engine.
Figure 7:
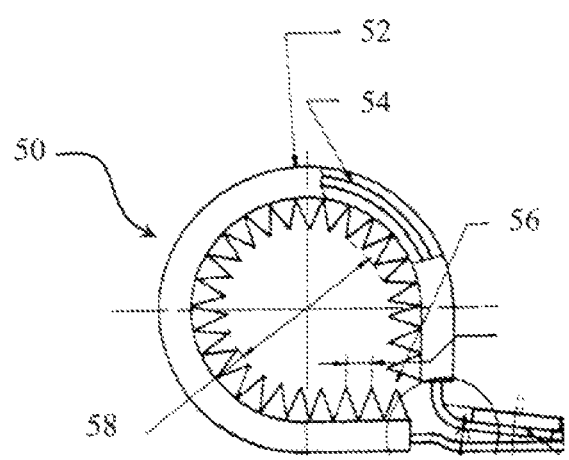
FIG. 7 shows a side view of a clip for holding a conventional harness in place.
Figure 8:
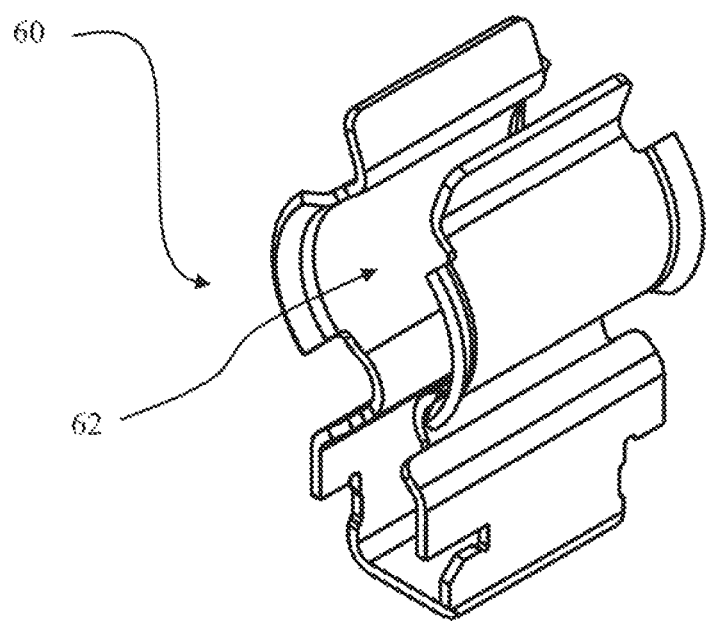
FIG. 8 shows a perspective view of an alternative clip for holding a conventional harness in place.
Figure 9:
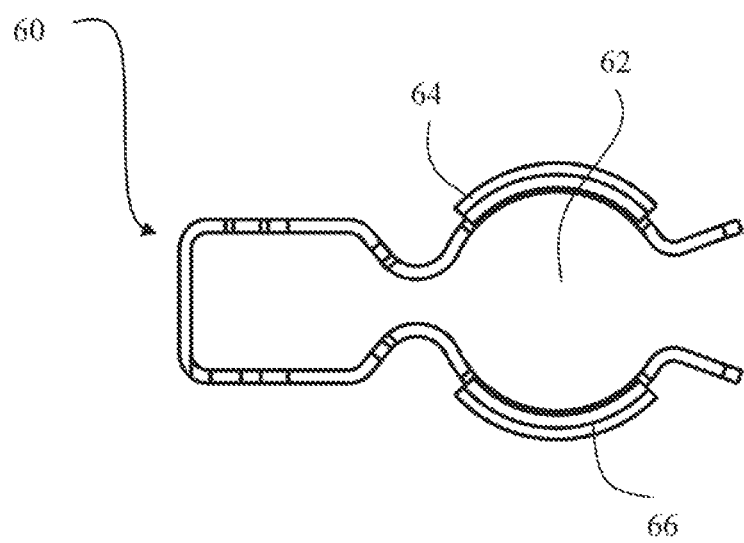
FIG. 9 shows a side view of the lip shown in FIG. 8.

With reference to FIG. 6, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

The gas turbine engine 10 shown in FIG. 6 may be at least a part of a gas turbine engine installation according to the present invention. The gas turbine engine 10 may comprise FPCB harnesses (such as those described above in relation to FIGS. 2 to 5) for transmitting/transferring electrical signals around the engine and/or to/from the engine 10 from other components, such as components of an airframe. The function and/or construction of the FPCB harnesses may be as described above and elsewhere herein.

Figure 10:
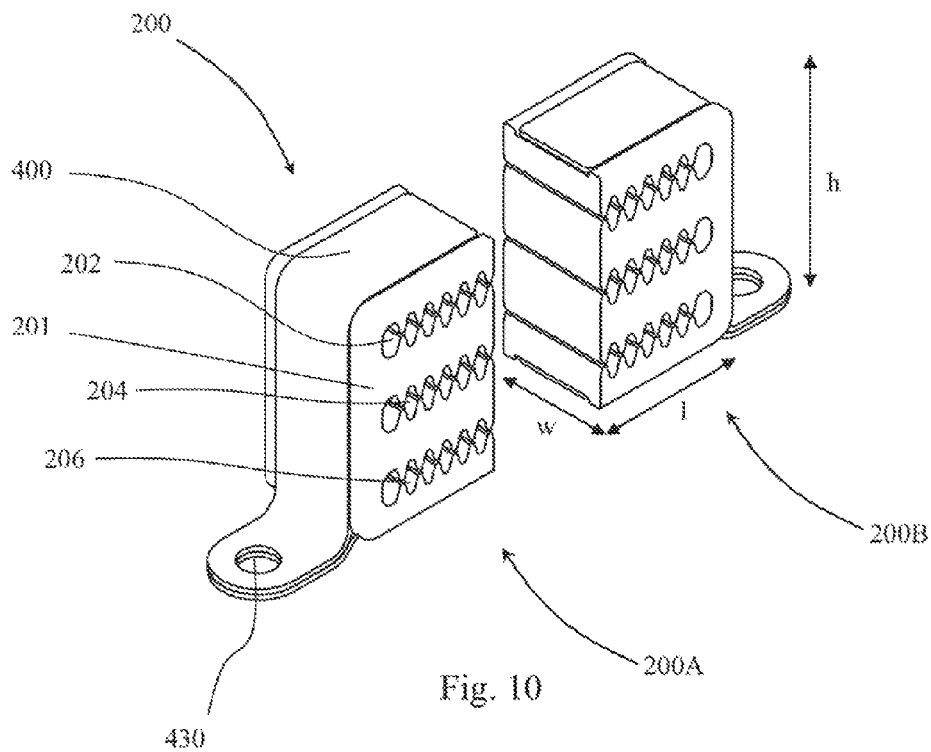
FIG. 10 shows a perspective view of clip in accordance with the present invention.
Figure 11:
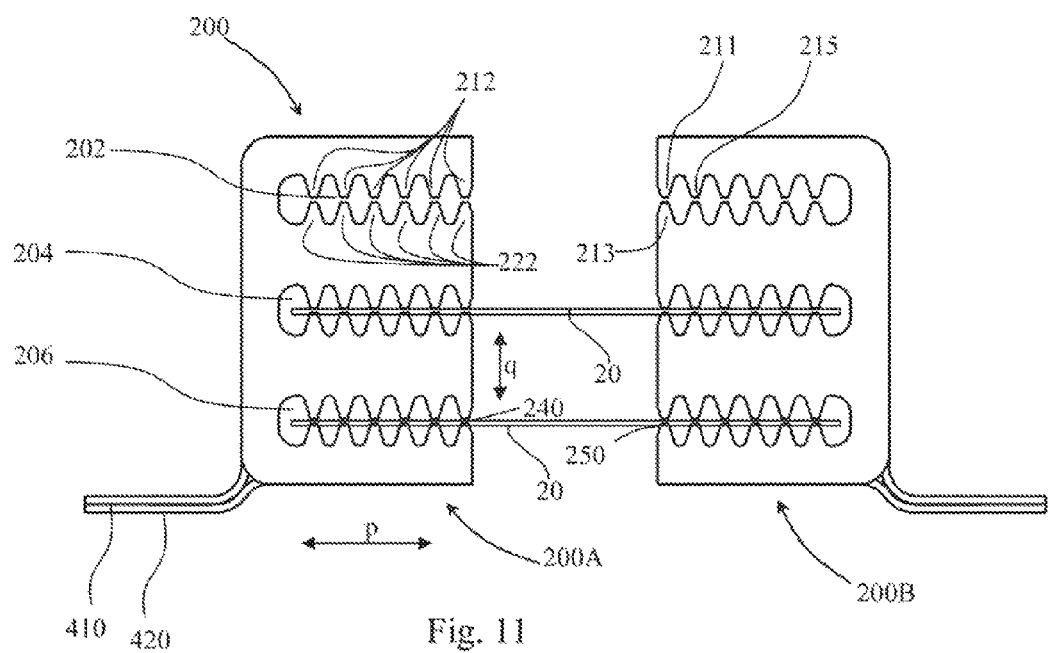
FIG. 11 shows a side view of two clips according to FIG. 10.

The FPCB harnesses may be attached to any part of the engine installation (of which the engine 10 may be a part) using a clip such as the clip 200 shown in FIGS. 10 and 11. In each of FIGS. 10 and 11, two clips 200A, 200B are shown. The two clips 200A, 200B may be used in conjunction with each other to hold opposing sides of a FPCB harness 20. Alternatively, just one of the clips 200 may be used to hold a FPCB harness.

Each clip 200 has three jaws 202, 204, 206 extending from (or being a part of) a main body 201. Each jaw 202, 204, 206 may be arranged to hold (or support) a respective FPCB harness 20. In particular, each jaw 202, 204, 206 may be arranged to receive a portion of a respective FPCB harness 20. The number of jaws corresponds to the number of FPCB harnesses that the clip 200 can hold. In the example shown in FIG. 11, the clip 200 is capable of holding 3 FPCB harnesses, but is only shown holding 2 FPCB harnesses 20. Other embodiments may thus comprise different numbers of jaws. For example, the clip 200 may have two jaws, or 4, 5, 6, 7, 8, 9, 10 or more than 10 jaws. It may also be possible to have clips with jaws of the type described and illustrated herein, but with only one jaw, although such clips with only one jaw would not have many of the advantages described herein in relation to the multi jawed clips.

Each jaw 202, 204, 206 has two sets of teeth, which may be referred to as an upper set of teeth 212 and a lower set of teeth 222. The teeth in the upper set 212 directly oppose corresponding teeth in the lower set 222. Thus, the tips of the teeth in both sets 212, 222 are aligned. In the FIG. 11 example, the teeth in both sets 212, 222 are aligned in the width direction of the FPCB harness that they are designed to hold, i.e. in the direction labelled 'p' in FIG. 11. Note that the direction 'p' labelled in FIG. 11 corresponds to the width direction 'y' of the FPCB harness shown in FIGS. 2 to 5 when inserted.

A gap 232 is provided between opposing teeth, i.e. between the upper set of teeth 212 and the lower set of teeth 222. This gap may be set according to the type of FPCB harness that the jaws 202, 204, 206 is designed to hold, for example the thickness of the FPCB harness. For example, the gap 232 may be set to be no greater than the thickness (the 'z' direction shown in FIGS. 2 to 5) of the FPCB harness being held. The gap 232 could be different for the jaws 202, 204, 206 of the same clip 200, if, for example, the clip 200 is intended to carry/hold FPCB harnesses of different thicknesses. In the example shown in FIG. 11, however, the gap 232 is the same for all jaws 202, 204, 206.

Some embodiments may have no gap 232 between opposing teeth 212, 222. Such embodiments may be particularly suitable, for example, to holding especially thin FPCB harnesses. The opposing sets of teeth 212, 222 do not, however, overlap in the direction labelled 'q' in FIG. 11 (which corresponds to the thickness direction of the FPCB harness shown in FIGS. 2 to 5 when installed). Thus the teeth 212, 222 are not intermeshed. Indeed, because the upper and lower sets of teeth 212, 222 are directly opposed to each other, they do not intermesh even if they are pushed together. Instead, the tips of two opposing teeth 211, 213 may contact each other if pushed together in the 'q' direction, but may not pass each other.

Because the upper and lower sets of teeth directly oppose each other, and thus cannot overlap so as to become intermeshed, more than one FPCB harness can be inserted into the clip 200 (and subsequently gripped by the teeth 212, 222 so as to be held) without undue difficulty. For example, even when one of the FPCB harnesses 20 has been inserted into one of the jaws (for example jaw 206), the opposing teeth of the other jaw(s) 202, 204 are prevented from becoming intermeshed, and thus further FPCB harnesses can be inserted into those jaws 202, 204 without undue hindrance.

In order to insert an FPCB harness 20 into a jaw 202, 204, 206, any suitable technique could be used. For example, the FPCB harness 20 could be pushed into the respective jaw 202, 204, 206 in the width direction of the FPCB harness 20, i.e. in the direction labelled 'p' in FIG. 11, through the mouth 240 of the jaw 206. Where only one clip 200 is used to hold a given FPCB harness 20, no further steps may be required in order for it to be gripped by the sets of teeth 212, 222. Where two clips 200A, 200B are used to hold a FPCB harness 20, the first clip 200A may be secured to the desired component, the FPCB harness may be inserted into the first clip 200A as described above, then the second clip 200B may be slid over the other side (in a width sense) of the FPCB harness, then the second clip 200B may be secured to the component. Of course, these are only examples of many possible ways in which an FPCB harness 20 could be attached to a component using one clip 200 or two clips 200A, 200B, and any suitable method may be used.

Once inserted, the FPCB harness is held by the clip 200, for example through being gripped by the opposing teeth 212, 222, which may be compliant and/or flexible and/or elastically deformable. The teeth 211, 213 of the FIGS. 10 and 11 embodiment have blunt tips 215. The tips 215 are squared off, and thus do not terminate in a sharp point or line. The teeth 211, 213 may thus be said to be truncated wedges. The teeth may be said to be elongate, with a longitudinal axis extending in the length direction of the FPCB harness that they are designed to receive.

Figure 12:
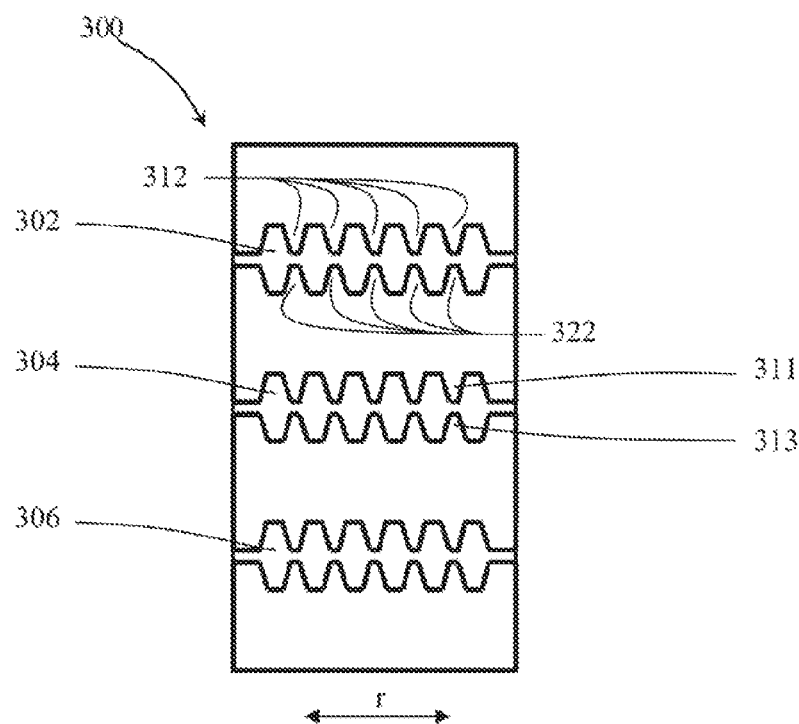
FIG. 12 shows a front view of an alternative clip in accordance with the present invention.
Figure 13:
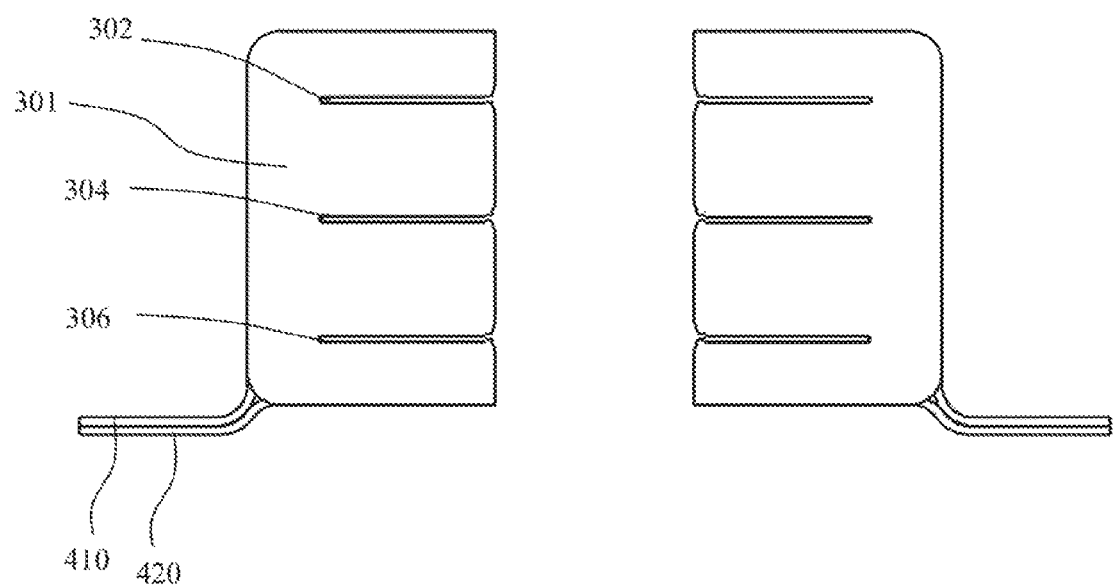
FIG. 13 shows a side view of two clips according to FIG. 12.

FIGS. 12 and 13 show a further embodiment of clip 300 for use in the present invention. The clip 300 also has three jaws 302, 304, 306. Each of the jaws 302, 304, 306 may receive a FPCB harness, although no such harnesses are shown in FIGS. 12 and 13. The clip 300 of FIGS. 12 and 13 shares many aspects and/or features with the embodiment of FIGS. 10 and 11. For example, each jaw 302, 304, 306 has opposing, non-overlapping sets of teeth 312, 322 which share advantages with the sets of teeth 212, 222 described above in relation to FIGS. 10 and 11.

In the FIGS. 12 and 13 clip 300, however, the teeth 311, 313 are arranged at right angles to the direction of the teeth 211, 213 in the FIGS. 10 and 11 embodiment. The teeth 311, 313 in the FIGS. 12 and 13 embodiment are elongate teeth with a longitudinal axis running in the width direction 'y' of the FPCB harness 20 that they are designed to receive. Thus, in the FIGS. 12 and 13 clip 300, the upper and lower sets of teeth 312, 322 are aligned in the direction labelled 'r' in FIG. 12, so as to be directly opposed.

The clips 200, 300 shown in FIGS. 10 to 13 have a support structure 400. The support structure provides support to the main body 201, 301 of the clip so as to restrict or minimize flexing/bending of the clip 200, 300. The support structure 400 may thus be stiffer, for example constructed from a stiffer material, than the main body of the clip 201, 301. The support structure 400 shown in the Figures is attached (for example bonded) to external surfaces of the main body 201, 301. However, other arrangements of support structure 400 may be used. For example, the support structure may penetrate into the material of the main body 201, 301 of the clips 200, 300, for example between the jaws. The support structure 400 shown in the Figures comprises two parts 410, 420, that may be attached together (for example by welding) to produce the final support structure 400. Again, other constructions could be used in clips for alternative embodiments.

The support structure 400 shown in the figures has an attachment portion 430 which in the illustrated example comprises a hole for receiving a fixing element, such as a screw, bolt, or rivet) that is configured to allow the clip 200, 300 to be attached to a component, for example of the gas turbine installation. As mentioned above, this may be a particularly convenient, lightweight and compact arrangement for connecting the clips 200, 300, and thus the FPCB harnesses 20, to components. However, some clips for use in embodiments of the invention may not have a support structure 400 at all, or may have a support structure 400 without an attachment portion 430.

Any suitable material may be used to manufacture the main body 201, 301 of the clips 200, 300, which may be the same as the material used to manufacture the jaws 202, 204, 206, 302, 304, 306. For example, the material may comprise one or more of ethylene-propylene rubber, a silicone based compound, and a nitrile material. In clips which have a support structure 400, the support structure 400 may be constructed from a stiffer material than the main body 201, 301, for example from a metal and/or a resin/fibre composite.

The clip 200, 300 could be any suitable size required to hold a FPCB harness 20. Purely by way of non-limitative example, and with reference to FIG. 10, the width 'w' of the clip 200, 300 may be in the range of from 5 mm to 200 mm, for example 10 mm to 150 mm, for example 25 mm to 100 mm, for example on the order of 50 mm. The length 'l' of the clip 200, 300 may be in the range of from 5 mm to 500 mm, for example 10 mm to 200 mm, for example 25 mm to 100 mm, for example on the order of 50 mm. The height 'h' of the clip 200, 300 may be in the range of from 0.5 mm to 50 mm for example 2 mm to 10 mm, for example 3 mm to 8 mm, for example on the order of 5 mm. In other embodiments, the dimensions 'l', 'h', and 'w' may be outside these ranges.

Where reference is made herein to a gas turbine engine installation, it will be appreciated that this term may include a gas turbine engine and/or any peripheral components to which the gas turbine engine may be connected to or interact with and/or any connections/interfaces with surrounding components, which may include, for example, an airframe and/or components thereof. Such connections with an airframe, which are encompassed by the term 'gas turbine engine installation' as used herein include, but are not limited to, pylons and mountings and their respective connections. The gas turbine engine itself may be any type of gas turbine engine, including, but not limited to, a turbofan (bypass) gas turbine engine, turbojet, turboprop, ramjet, scramjet or open rotor gas turbine engine, industrial It will be appreciated that many alternative configurations and/or arrangements of the clips 200, 300 other than those described herein may fall within the scope of the invention. For example, alternative arrangements of jaws 202, teeth sets 212, 222, tooth geometry 211 (such as tip geometry 215), support structure 400, and/or FPCB harness 20 may fall within the scope of the invention and may be readily apparent to the skilled person from the disclosure provided herein. Furthermore, any feature described and/or claimed herein may be combined with any other compatible feature described in relation to the same or another embodiment.

We claim:

1. A gas turbine engine installation comprising:
   at least two flexible printed circuit board harnesses comprising electrically conductive tracks formed in a non-electrically conductive substrate arranged to transfer electrical signals around the engine installation; and
   at least one clip holding the at least two flexible printed circuit board harnesses, each clip comprising:
   a first jaw and a second jaw holding respective first and second ones of the at least two flexible printed circuit board harnesses, the first and second jaws each comprising a set of directly opposing, non-overlapping, compliant teeth, wherein
   the opposing teeth of both the first and second jaws are arranged to directly engage and thereby grip the non-electrically conductive substrate of the respective harness, and
   the teeth are separated from the electrically conductive tracks by the non-electrically conductive substrate, such that there is no electrical connection between the electrically conductive tracks and the teeth.

2. A gas turbine engine installation according to claim 1, wherein a gap is provided between the directly opposing teeth.

3. A gas turbine engine installation according to claim 2, wherein the gap is in the range of from 0.1 mm to 5 mm.

4. A gas turbine engine installation according to claim 1, wherein the teeth extend to a tip, and the tips of the teeth are blunt.

5. A gas turbine engine installation according to claim 1, wherein the first and second jaws are formed using a material comprising one or more of: ethylene-propylene rubber, a silicone based compound, and a nitrile material.

6. A gas turbine engine installation according to claim 1, wherein at least one of the at least one clip further comprises a support structure configured to resist changes in the shape of the clip under operational loads, the support structure being relatively stiffer than the jaws.

7. A gas turbine engine installation according to claim 6, wherein:
   the clip comprises a main body that incorporates the jaws; and
   the support structure extends around at least a part of the main body.

8. A gas turbine engine installation according to claim 6, wherein the support structure is formed using a material comprising metal and/or a composite/fibre resin.

9. A gas turbine engine installation according to claim 6, wherein the support structure further comprises an attachment portion used to attach the clip to the gas turbine engine installation, or a component thereof.

10. A gas turbine engine installation according to claim 1, wherein each of the at least two flexible printed circuit board harnesses is a thin, elongate member having a major surface defined by a length and a width, and a thickness normal to the major surface.

11. A gas turbine engine installation according to claim 10, wherein the teeth of at least one of the at least one clip extend in a direction that corresponds to the length direction of the respective flexible printed circuit board harness when gripped.

12. A gas turbine engine installation according to claim 10, wherein the teeth of at least one of the at least one clip extend in a direction that corresponds to the width direction of the respective flexible printed circuit board harness when gripped.

13. A gas turbine engine installation according to claim 10, wherein:
   a lengthwise extending portion of a flexible printed circuit board harness of the at least two flexible printed circuit board harnesses is held by two opposing clips, each opposing clip extending across no more than half of the width of the flexible printed circuit board harness.

14. A method of assembling a gas turbine engine installation comprising:
   providing at least two flexible printed circuit board harnesses arranged to transfer electrical signals around the engine installation, the flexible printed circuit board harnesses comprising electrically conductive tracks formed in a non-electrically conductive substrate;

attaching a first one of the at least two flexible printed circuit board harnesses to a remainder of the gas turbine engine installation by inserting a portion of the first one of the harnesses into a first jaw provided in a clip; and attaching a second one of the at least two flexible printed circuit board harnesses to the remainder of the gas turbine engine installation, after attaching the first one of the harnesses, by inserting a portion of the second one of the harnesses into a second jaw provided in the clip, wherein:

each jaw comprises a set of directly opposing, non-overlapping, compliant teeth arranged to directly engage and thereby grip the non-electrically conductive substrate of the respective harness, such that before and during the step of attaching the second one of the harnesses, the opposing teeth of the second jaw are not intermeshed, and the teeth are separated from the electrically conductive tracks by the non-electrically conductive substrate, such that there is no electrical connection between the electrically conductive tracks and the teeth.

* * * * *